United States Patent
Givonetti (10) Patent No.: US 7,458,443 B2
(45) Date of Patent: Dec. 2, 2008

(54) PEDAL ACTUATED BICYCLE BRAKE SYSTEM

(76) Inventor: Raymond Givonetti, 12622 Woodcove La., Knoxville, TN (US) 37922

( * ) Notice: Subject to any disclaimer, the term of this patent is extended or adjusted under 35 U.S.C. 154(b) by 58 days.

(21) Appl. No.: 11/430,415

(22) Filed: May 9, 2006

(65) Prior Publication Data
US 2007/0261925 A1    Nov. 15, 2007

(51) Int. Cl.
*B62L 1/00* (2006.01)
(52) U.S. Cl. .............. 188/24.11; 188/24.17; 188/24.16; 188/24.22
(58) Field of Classification Search ............. 188/24.17, 188/24.11, 24.16, 24.22; 74/489, 480, 481, 74/502.2, 502.6, 500.5, 519, 594
See application file for complete search history.

(56) References Cited

U.S. PATENT DOCUMENTS

| | | | | |
|---|---|---|---|---|
| 1,456,103 A * | 5/1923 | Goodchild | ............... | 188/206 A |
| 3,782,507 A | 1/1974 | Shreve | | |
| 4,020,925 A * | 5/1977 | Ryan et al. | ................... | 188/26 |
| 4,182,194 A | 1/1980 | Tomozawa | | |
| 4,260,044 A | 4/1981 | Foster | | |
| 4,267,898 A * | 5/1981 | Wheaton | ................... | 180/205 |
| 4,313,530 A | 2/1982 | Boyd | | |
| 4,421,337 A * | 12/1983 | Pratt | ........................ | 280/277 |
| 4,462,488 A | 7/1984 | Boyd | | |
| 4,598,805 A * | 7/1986 | Tomozawa | .............. | 192/217.6 |
| 4,768,607 A * | 9/1988 | Molina | ....................... | 180/165 |
| 5,027,930 A * | 7/1991 | Reed | ....................... | 192/217.2 |
| 5,064,035 A * | 11/1991 | Tsuchie | .................. | 192/217.6 |
| 5,094,380 A * | 3/1992 | Nasiatka | ..................... | 227/156 |
| 5,918,894 A * | 7/1999 | Toronto et al. | ............. | 280/237 |
| 6,029,780 A | 2/2000 | Phillips | | |
| 6,325,386 B1 * | 12/2001 | Shoge | ........................ | 277/500 |
| 6,386,566 B1 * | 5/2002 | Freeberg et al. | ............ | 280/237 |
| 6,607,328 B1 * | 8/2003 | Treiber et al. | ............. | 403/408.1 |
| 2006/0163961 A1 * | 7/2006 | Iteya et al. | ................ | 310/75 C |

* cited by examiner

*Primary Examiner*—Robert A. Siconolfi
*Assistant Examiner*—James K Hsiao (57) ABSTRACT

A braking mechanism for actuating a supplemental brake, used in association with a pedal-actuated brake, which increases total brake effectiveness and increases reliability through redundancy as a result of the coaster brake functioning as a back-up to a failed supplemental brake. A brake lever arm is adapted to cooperate with a coaster brake and a bicycle frame to engage a brake cable and operate the supplemental brake when the coaster brake is engaged. During assembly, the brake lever arm is allowed to rotate about an axle, but is limited in such rotation to a selected degree by placement of a limiter cam. Once installed, a distal end of the brake lever arm is permitted limited rotation with respect to the bicycle. A brake cable secured between the brake lever arm distal end and a supplemental brake is disposed linearly a distance sufficient to actuate the supplemental brake.

16 Claims, 4 Drawing Sheets

PEDAL ACTUATED BICYCLE BRAKE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The present invention pertains to the field of bicycle brakes. More particularly, this invention is a pedal actuated bicycle brake system for actuating a supplemental brake of conventional technology associated with either or both of the front and rear wheels of a bicycle by rotating the pedals of the bicycle in reverse, thereby increasing the brake effectiveness.

2. Description of the Related Art

Bicycles are known to have several different types of brakes and braking systems. Typically brakes are actuated either via a hand lever located on the handle bars or via the pedals. Coaster brakes are common especially in single-speed bicycles. This type of braking system is actuated by back-pedaling, which actuates a braking mechanism internal to a wheel hub. Accordingly, coaster brakes are disposed in the rear wheel hub.

With the advent of multi-speed bicycles, hand-operated brakes have become more prominent due to incompatible technologies. Specifically, coaster brake technology was not compatible with that multi-speed technology. Since the introduction of the multi-speed bicycle, technology has been developed where both the coaster brake technology and the new multi-speed technology has been incorporated in the same wheel hub. At the same time, rim and disc brake technology has advanced to a point where they have certain advantages over coaster brakes. It has been shown that coaster brakes are susceptible to over-heating to a point of permanent damage on long steep downgrades while rim brakes show only a modest increase in temperature. However, a major advantage of coaster brakes is that they are pedal-activated, removing the burden of holding a hand-actuated system.

Typical braking systems of the art are those devices disclosed in the following U.S. Patents:

| U.S. Pat. No. | Inventor(s) | Issue Date |
| --- | --- | --- |
| 3,782,507 | R. L. Shreve | Jan. 1, 1974 |
| 4,020,925 | J. W. Ryan et al. | May 3, 1977 |
| 4,182,194 | Y. Tomozawa | Jan. 8, 1980 |
| 4,260,044 | E. E. Foster | Apr. 7, 1981 |
| 4,313,530 | W. Boyd | Feb. 2, 1982 |
| 4,462,488 | W. Boyd | Jul. 31, 1984 |
| 4,598,805 | S. Tomozawa | Jul. 8, 1986 |
| 5,027,930 | B. E. Reed | Jul. 2, 1991 |
| 5,064,035 | K. Tsuchie | Nov. 12, 1991 |
| 6,029,780 | J. Phillips | Feb. 29, 2000 |

Of these patents, Shreve, in his '507 patent, discloses a brake actuating mechanism for a two wheeled vehicle such as a motorcycle having front and rear brakes. The '507 mechanism sequentially operates the front and rear brakes upon actuation of a brake pedal, with the rear brake being applied before the front brake in order to minimize instability and loss of vehicle control. While the rear brake is operated by the brake pedal, Shreve discloses that the front brake is actuated by either or both of the brake pedal or a hand lever mounted on the handle bar. Shreve uses conventional brakes in association with the '507 brake actuating mechanism.

In the '925 patent, Ryan et al., teach a bicycle braking system wherein both front and rear wheels are equipped with a coaster brake. Flexible connections are provided between a reaction torque arm of the rear coaster brake and the front brake for applying the front brake. Interposed in the connections is a proportioning lever mechanism for adjustably controlling the amount of braking effect transmitted to the front brake. Flexible connections are provided from the reaction torque arm of the front brake back to the lever mechanism for applying a feedback increment of actuation to the front brake.

Y. Tomozawa, in the '194 patent, discloses a multi-speed free wheel hub with a coaster brake for use in a bicycle. The hub includes a driving mechanism for driving the bicycle and a braking mechanism for braking the bicycle, each independent of the other. A driving female screw cylinder is incorporated into the driving mechanism to achieve the complete driving and braking modes of operation. As in conventional coaster brakes, the braking mechanism is engaged by the rider by back-pedaling.

Foster ('044) teaches a bicycle having front and rear wheel caliper brakes operated via a pedal crank assembly. The pedal crank assembly includes a shaft extending through a hub and connected to pedal cranks. The bicycle also includes a brake control assembly having a cam mounted on the shaft outwardly of the hub for rotation with the shaft, the cam having at least one working edge surface. A plate carried on the shaft is in substantially planar parallel relationship to the cam. The plate pivotally mounts a cam follower for engaging the cam working edge when the rider of the bicycle back pedals. A substantially vertically extending rod is loosely engaged at its lower end to the plate and fixedly engaged in its upper end portion to brake control cables leading from the caliper brakes. The rod is journaled for axial rotation and resilient means urges the same into spaced relationship with respect to the cam follower with which the rod is engageable upon rotation for releasing the cam follower from engagement with the cam.

In his '530 patent, Boyd discloses a coaster brake for a bicycle. The coaster brake includes a brake operating lever consisting of a yoke and an integral arm coupled to the pedal crankshaft of the bicycle by a self-acting unidirectional friction clutch, formed by a coil spring embracing the crankshaft. The spring includes two portions, with one being disposed on either side of the yoke. The lever moves a brake actuating rod or cable actuating a wheel brake which may be of several different types.

In his '488 patent, Boyd discloses a bicycle braking system incorporating a pedal crankshaft operated brake actuator. A lost motion connection is provided in the chain drive to the rear wheel of the bicycle, the lost motion being taken up by a highly progressive spring of sufficient strength to require a significant proportion of normal pedaling torque to overcome its action. Also provided is a brake incorporating a resilient stirrup supported at three points distributed around the rim of the rear wheel of the bicycle, the stirrup arms being subjected to a wedging action upon actuation of the brake causing brake shoes mounted on the stirrup to grip the rim of the wheel with a caliper action.

S. Tomozawa, in the '805 patent, discloses a typical coaster brake having a screw cone provided with a tapered part. The tapered part is cooperatively threaded to mate in an internal end part of a male screw cylinder to which a chain gear is fixed. The screw cone is removed by means of the rotation of the male screw cylinder. A brake shoe is in mesh with a fixed brake cone which is provided outwardly of the screw cone to engage with a hub body by pressing the brake shoe being expanded.

Reed discloses in the '930 patent a coaster brake assembly which is coupled directly to a drive shaft. The drive shaft has a threaded driver integral thereon. A clutch cone having internal threads traverses in axial directions as it threads on or off the driver depending on the rotation of the driver. A brake cone is provided which has a smooth axial bore through which the drive shaft rotates. The axial movement of the clutch cone toward the brake cone operates to force brake shoes against the inside wall of the hub. A spring is provided to facilitate threading action between the clutch cone and the driver.

In the '035 issued to Tsuchie, a coaster brake is provided with a clutch cone screw-fitted to a driving body which is driven by pedals, to be axially movable in correspondence with the driving body's turning direction. A brake cone is supported through a clutch mechanism which is limited to rotation in the reverse direction. A brake member is operated to apply a brake on the hub shell by the clutch cone moving to approach the brake cone side, when the driving body is turned in a reverse direction. When the hub shell is turning in the forward direction, the brake action may be exhibited by applying to the driving body reverse rotation similarly top conventional coaster brake. The brake cone is rotatable in the reverse direction by means of the clutch mechanism and as the driving body is subjected to a reverse turning. When the hub shell is not turning in the forward direction, the brake cone will turn in the reverse direction integrally together with the driving body, the clutch cone and the brake member and in concert with the hub shell. Thus, the coaster brake mechanism operates as a reverse driving mechanism.

Finally, the '780 device taught by Phillips is a crank assembly for a chain driven mechanism such as a bicycle. The crank assembly has at one end of a crank arm, a journal adapted for engagement with an axle. The axle has at its other end a connection. The one end of the crank arm has mounted thereon a housing via a unidirectional variable clutch, the housing having an extension to which, in use, an activation means such one or more brake cables are attached. The arrangement is such that during normal forward rotation the crank arm moves normally and the housing is stationary relative thereto, while during back or reverse movement of the crank arm the housing moves to activate the brake cable or cable means.

BRIEF SUMMARY OF THE INVENTION

The present invention is a braking mechanism for actuating a supplemental brake, the braking mechanism being used in association with a pedal-actuated brake for actuating a rear wheel brake. The braking mechanism of the present invention provides for the actuation of a coaster brake, while further providing a simultaneously pedal-actuated supplemental brake to enhance the performance of the coaster brake. The brake is comprised of a brake lever arm and a limiter cam, each adapted to cooperate with a coaster brake and a bicycle frame to engage a brake cable and operate the supplemental brake when the coaster brake is engaged.

The bicycle frame is adapted to receive a fastener for mounting the distal end of the brake lever arm. In one embodiment, the bicycle frame is provided with a bracket disposed between and permanently secured to upper and lower frame members, such as by welding. The bracket defines a slotted opening, with a longitudinal axis oriented substantially radially away from the center of the rear wheel. The slotted opening permits horizontal adjustment of the brake lever arm to adjust chain tension. The proximal end of the brake lever arm and the limiter cam are adapted to be received between the rear forks of the bicycle.

The coaster brake defines a cone and a threaded axle. The threaded axle defines a keyway in the form of a longitudinal slot for receiving a tab defined by the limiter cam. The proximal end of the brake lever arm is received on a keyway carried by the coaster brake cone. A flat washer is mounted on the threaded axle and positioned in engagement with the brake lever arm. The limiter cam is positioned on the threaded axle in engagement with the flat washer.

The limited cam is provided to limit the degree of rotation of the brake lever arm with respect to the coaster brake specifically during the assembly of the braking mechanism and prior to its installation on the rear fork of the bicycle frame. The limiter cam thus serves to maintain the proper angular position of the brake lever arm during assembly. The limiter cam defines a plurality of spaced apart teeth extending radially away from the center thereof. The brake lever arm defines an indexing pin mounted on the outside surface of the brake lever arm and extending away therefrom, and positioned to be received between two of the limiter cam teeth. When the brake lever arm is rotated about the axis of the coaster break threaded axle, the indexing pin ultimately engages one or the other of the two limiter cam teeth, thereby limiting angular movement of the brake lever arm. The degree of angular movement is determined by the linear distance between the limiter cam teeth, the arc length between the limiter cam teeth, and the diameter of the indexing pin.

The brake lever arm defines a slotted opening proximate the distal end thereof, and oriented substantially tangential to an arcuate path whose center point is at the axis of the coaster brake threaded axle. The brake arm is thus limited to rotational movement about the axis of the coaster brake threaded axle, and is limited with respect to the bicycle frame a degree defined by the distance between the axis of the coaster brake threaded axle and approximately the centerline of the slotted opening, the length of the slotted opening, and the diameter of the fastener and/or shoulder washer as described below.

In order to activate the supplemental brake, the distal end of the brake lever arm defines a brake cable engagement yoke adapted to engage the proximal end of a conventional brake cable. The brake cable distal end engages the supplemental brake. The yoke defines two closely spaced apart members defining an inverted channel along the top edge and directed inwardly from the brake lever arm. The end of a conventional brake cable is received within the channels and the brake cable itself is received within a slot defined between the two members. As the brake lever arm is rotated downward, the yoke engages the proximal end of the brake cable and pulls it downward, thus translating the rotational movement of the brake lever arm to linear movement of the brake cable. As the proximal end of the brake cable is moved, the distal end of the brake cable actuates the supplemental brake.

After mounting the brake lever arm and the limiter cam on the threaded axle, the threaded axle is slid onto the rear bicycle fork and secured with a washer and a nut in conventional fashion. A shoulder washer is then inserted into the brake lever arm distal end slotted opening. A socket head screw is inserted through the bicycle frame slotted opening and the shoulder washer and a locknut is secured thereto. The shoulder washer is configured to define at least a portion having an outside diameter dimensioned to be loosely received within the brake lever arm distal end slotted opening. The shoulder washer defines a proximal end defining an outside diameter larger than the slotted opening and a length smaller than a distance between the bicycle frame slotted opening and the brake lever arm, thereby ensuring that while the screw and the shoulder washer are secured to the bicycle frame, the brake lever arm is allowed to freely rotate with respect to the bicycle frame within the above-described limits.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A braking mechanism for actuating a supplemental brake, the braking mechanism being used in association with a pedal-actuated brake for actuating a rear wheel brake. The braking mechanism of the present invention provides for the actuation of a coaster brake, while further providing a simultaneously actuated supplemental brake to enhance the performance of the coaster brake. The braking mechanism is illustrated generally at 10 in the figures. The braking mechanism, or brake 10, is adapted to be mounted on a rear coaster brake 58 and to actuate a supplemental brake via a conventional brake cable 48.

Figure 1:
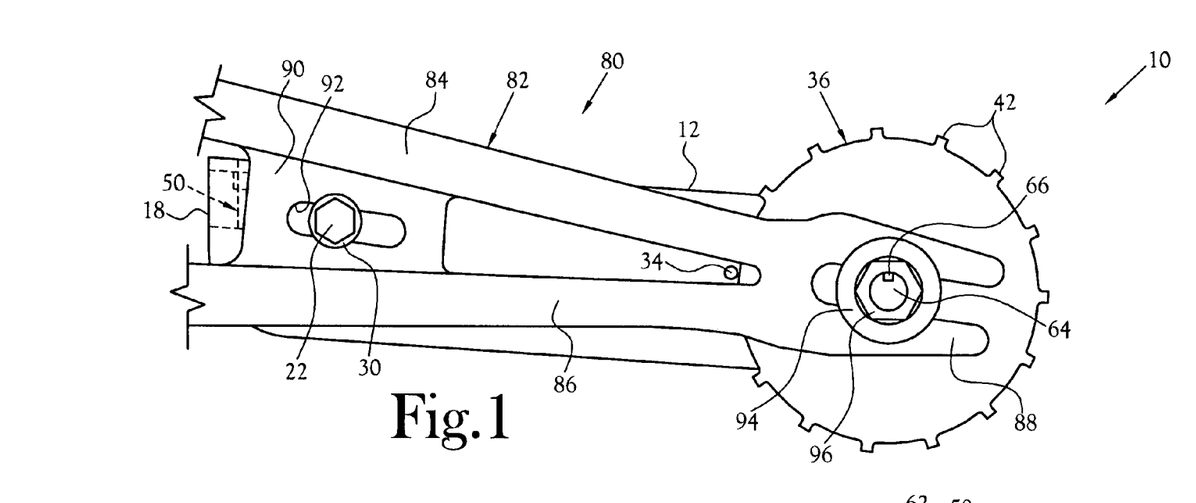
FIG. 1 is an elevation view of a braking mechanism constructed in accordance with several features of the present invention.
Figure 2:
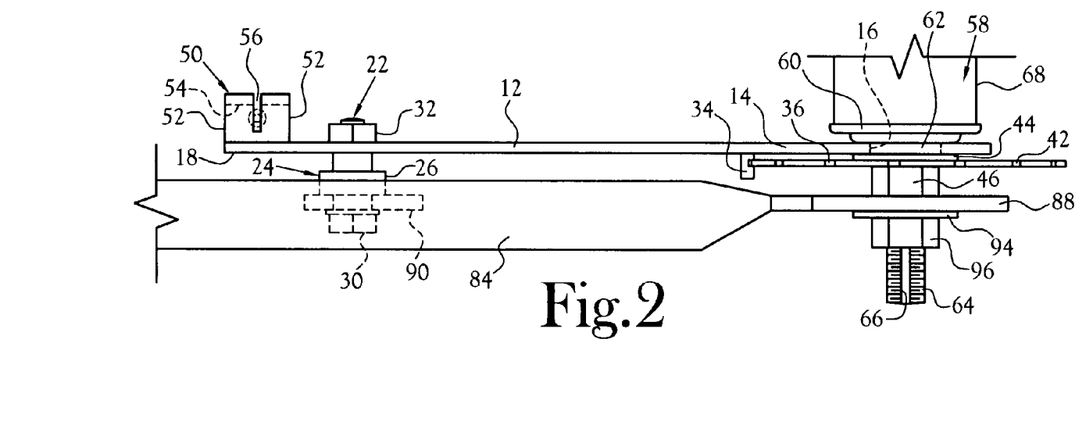
FIG. 2 is a top plan view of the braking mechanism of FIG. 1.

FIGS. 1-2 illustrate one embodiment of the brake 10 of the present invention assembled on one adaptation of a bicycle frame 82. Specifically, FIGS. 1 and 2 illustrate, respectively, a side elevation view and a top plan view of the brake 10 and a portion of the bicycle frame 82 and coaster brake 58 of a conventional bicycle 80. Generally, the brake 10 is comprised of a brake lever arm 12 and a limiter cam 36. The brake lever arm 12 is adapted to cooperate with a coaster brake 58 and a bicycle frame 82, and defines a yoke 50 for engaging a brake cable 48 to operate the supplemental brake (not shown) when the coaster brake 58 is engaged. The limiter cam 36 is adapted to limit the rotation of the brake lever arm 12 with respect to the coaster brake 58 during assembly and prior to mounting on the bicycle frame 82.

Referring to FIG. 1, the bicycle frame 82 is adapted to receive a fastener 22 for mounting the distal end 18 of the brake lever arm 12, as will be discussed in greater detail below. In the illustrated embodiment, the bicycle frame 82 is provided with a bracket 90 disposed between and permanently secured to upper and lower frame members 84, 86, such as by welding. The bracket 90 defines a slotted opening 92, with a longitudinal axis oriented substantially radially away from the center of the rear wheel. The slotted opening 92 permits horizontal adjustment of the brake lever arm 12 to adjust the tension of the chain (not shown). The proximal end 14 of the brake lever arm 12 and the limiter cam 36 are adapted to be received between the rear forks 88 of the bicycle 80.

As illustrated in FIG. 2, the coaster brake 58 defines a cone 60 rotatably received within a hub 68, and a threaded axle 64 fixed within the hub 68. A key 62 is carried on the cone 60 and defines an opening through which the threaded axle 64 is received. The key 62 and the threaded axle 64 are configured such that they are independently rotatable about the axis of the threaded axle 64. The threaded axle 64 defines a keyway 66 in the form of a longitudinal slot for receiving a tab 40 defined by the limiter cam 36, as will be described in greater detail below. The proximal end 14 of the brake lever arm 12 is adapted to engage the coaster brake cone key 62. A flat washer 44 is mounted on the threaded axle 64 and positioned in engagement with the brake lever arm 12. The limiter cam 36 is positioned on the threaded axle 64 in engagement with the flat washer 44.

Referring briefly to FIG. 1, the brake lever arm 12 defines a keyway 16 at the proximal end 14 thereof. The keyway 16 is configured to closely receive the brake cone key 62 such that as the brake 58 is turned, the key 62 engages the brake lever arm keyway 16 and thus moves the brake lever arm 12. The brake lever arm 12 further defines a slotted opening 20 proximate the distal end 18 thereof, and oriented substantially tangential to an arcuate path whose center point is at the axis of the coaster brake threaded axle 64. Once mounted on the bicycle 80, the brake lever arm 12 is thus limited to rotational movement with respect to the bicycle frame 82 a degree defined by the distance $L_1$ between the axis of the coaster brake threaded axle 64 and approximately the centerline of the slotted opening 20, the length $L_2$ of the slotted opening 20, and the diameter of the fastener 22 as described below. In the illustrated embodiment, the slotted opening 20 limits the degree of rotation of the brake lever arm 12 to less than eight degrees (8°). The brake 10 of the present invention is specifically configured to allow a minimum amount of rotation of the brake lever arm 12 to maintain proper assembly of the coaster brake 58 (correct bearing play) while providing enough linear motion to activate the supplemental brake.

Figure 4:
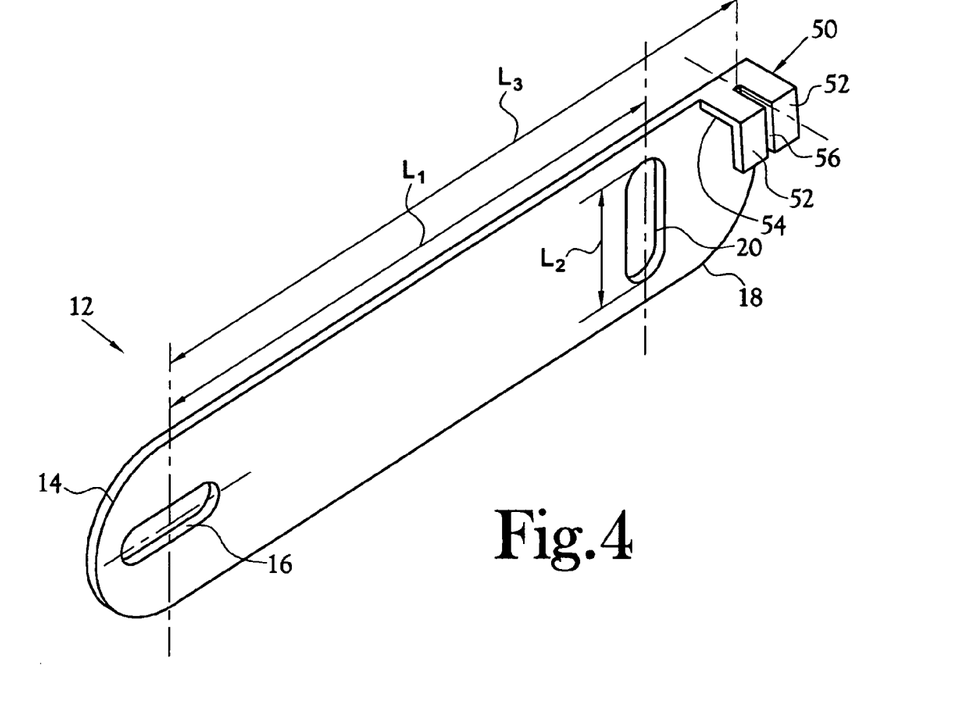
FIG. 4 is a perspective illustration of the brake lever arm incorporated in the braking mechanism of FIG. 1, further illustrating the details of the brake cable engagement yoke.

In order to activate the supplemental brake, the distal end 18 of the brake lever arm 12 defines a brake cable engagement yoke 50 adapted to engage one end of a conventional brake cable 48. The brake cable distal end (not shown) engages the supplemental brake. As better illustrated in FIG. 4, the yoke 50 defines two closely spaced apart members 52 defining an inverted channel 54 along the top edge and directed inwardly from the brake lever arm 12. The end of a conventional brake cable 48 is received within the channels 54 and the brake cable 48 itself is received within a slot 56 defined between the two members 52. As the brake lever arm 12 is rotated downward, the yoke 50 engages the brake cable 48 and pulls it downward, thus translating the rotational movement of the brake lever arm 12 to linear movement of the brake cable 48. As the proximal end of the brake cable 48 is moved, the distal end of the brake cable 48 actuates the supplemental brake.

Referring again to FIG. 2 the limiter cam 36 defines a plurality of spaced apart teeth 42 extending radially away from the center of the limiter cam 36. The brake lever arm 12 defines an indexing pin 34 mounted on its outside surface, extending away therefrom, and positioned to be received between two of the limiter cam teeth 42. When the brake lever arm 12 is rotated about the axis of the coaster break threaded axle 64, the indexing pin 34 ultimately engages one or the other of the two limiter cam teeth 42, thereby limiting angular movement of the brake lever arm 12. As will be described in greater detail below, the limiter cam 36 is provided for limiting the rotation of the brake lever arm 12 about the threaded axle 64 during the assembly of the brake 10 and prior to mounting of the brake 10 on the bicycle 80. The degree of angular movement is determined by the linear distance between the limiter cam teeth 42, the arc length between the limiter cam teeth 42, and the diameter of the indexing pin 34. In the illustrated embodiment, for an indexing pin 34 having a diameter of 0.125 inches, a limiter cam teeth 42 spacing of 20 degrees between teeth 42, and a limiter cam 36 radius of 1.5 inches, the angular freedom of the brake lever arm 12 with respect to the limiter cam 36 is approximately 15.225 degrees. It will be understood that such dimensions are for illustrative purposes only, and that the present invention is not limited to such dimensions.

Figure 3:
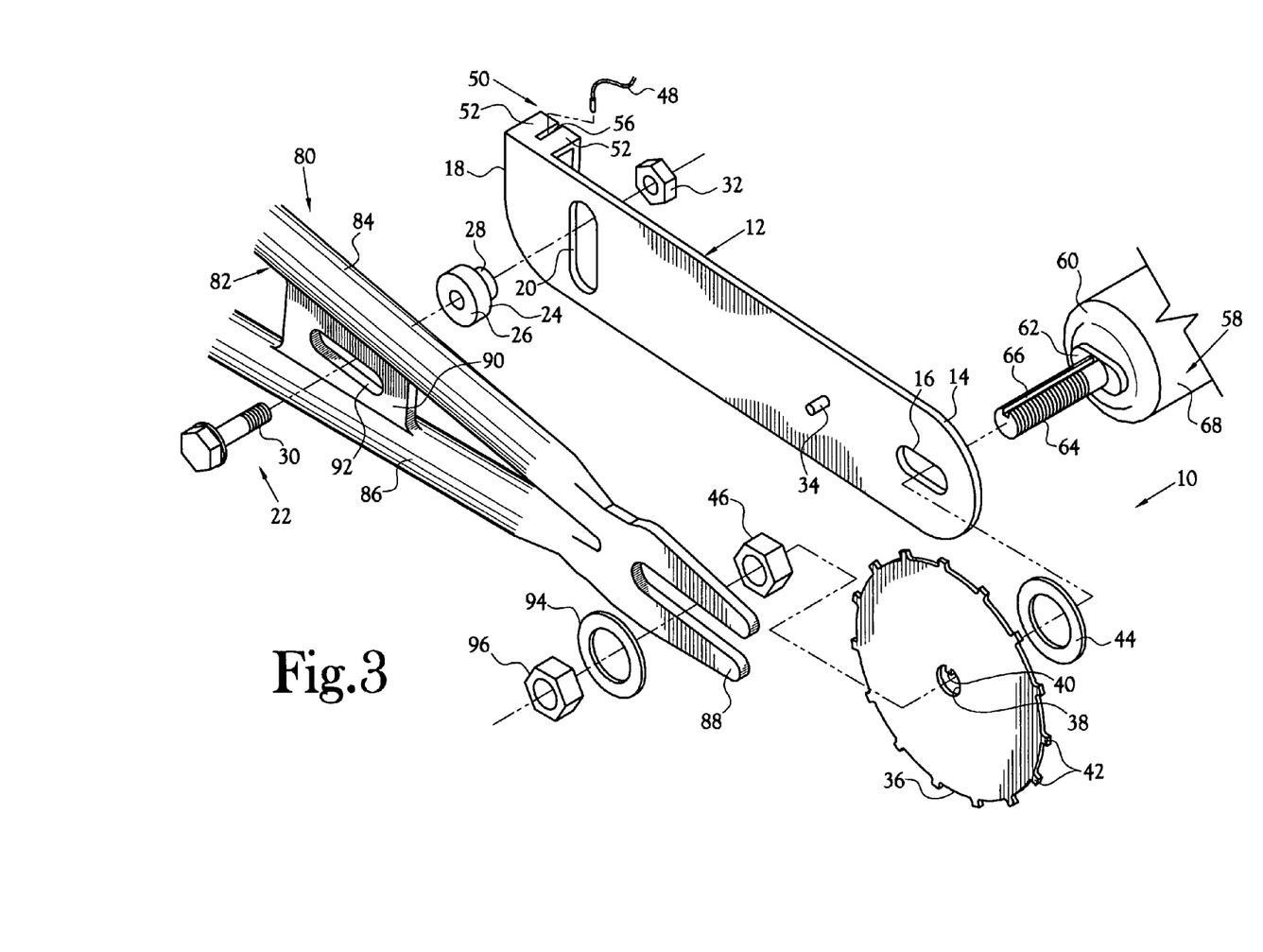
FIG. 3 is an exploded perspective illustration of the braking mechanism of FIG. 1, showing the individual components thereof.

The individual components of the brake 10 of the present invention are illustrated more clearly in FIG. 3, which is an exploded perspective view of the brake 10. Illustrated is the coaster brake 58 defining a cone 60 having a key 62, and including a threaded axle 64. The threaded axle 64 defines a keyway 66 for receiving the tab 40 defined by the limiter cam 36. The brake cone key 62 is received within the brake lever arm proximal end slotted opening 20. The slotted opening 20 is similar to conventional keyways, thereby permitting mounting on most coaster brakes 58. The flat washer 44 and the limiter cam 36 are then received over the threaded axle 64. The nut 46 is then threaded onto the threaded axle 64 in order to secure the brake lever arm 12 and the limiter cam 36 in relative position with respect to the coaster brake 58. The nut 46 is snugly positioned in order to maintain the brake lever arm 12, the flat washer 44 and the limiter cam 36 in position, while allowing the brake lever arm 12 to pivot with respect to the limiter cam 36 and, more particularly, with respect to the bicycle 80.

The limiter cam 36 defines an opening 38 adapted to closely receive the threaded axle 64. The tab 40 extends into the opening 38 and is adapted to be closely received within the keyway 66 defined by the threaded axle 64. Accordingly, the limiter cam 36 is restricted from movement with respect to the threaded axle 64. The brake lever arm 12 is allowed to rotate about the axis of the threaded axle 64 through an angle limited by either or both of the angular distance between two limiter cam teeth 42 (ideally only during assembly) and the slotted opening 20 defined in the distal end 18 of the brake lever arm 12.

To maintain continuous quality assurance in the field and for manufacturing produceability, the limiter cam 36 is configured to restrict the rotation of the brake lever arm 12 relative to the threaded axle 64. Since the brake lever arm 12 is allowed to rotate, it must be positioned in the proper position when assembling the wheel to the rear fork 88. In the illustrated embodiment, the brake lever arm 12 is mounted on the brake cone 60, with the brake lever arm keyway 16 closely receiving the brake cone key 62 and the proper bearing play in the coaster brake 58 is set. The flat washer 44 and the limiter cam 36 are then mounted on the threaded axle 64 and the nut 46 is then snugly secured to the point where the brake lever arm 12 is permitted to rotate about the threaded axle 64.

After mounting the brake lever arm 12 and the limiter cam 36 on the threaded axle 64, the threaded axle 64 is slid onto the rear bicycle fork 88 and secured with a washer 94 and a nut 96 in conventional fashion. The fastener 22 is then installed, the fastener 22 of the illustrated embodiment including a shoulder washer 24, a socket head screw 30, and a locknut 32. The shoulder washer 24 is then inserted into the brake lever arm distal end slotted opening 20. The socket head screw 30 is inserted through the bicycle frame slotted opening 92 and the shoulder washer 24 and the locknut 32 is secured thereto. The shoulder washer 24 is configured to define at least a portion having an outside diameter dimensioned to be loosely received within the brake lever arm distal end slotted opening 20. In the illustrated embodiment, the shoulder washer 24 defines a proximal end 26 defining an outside diameter larger than the bicycle frame slotted opening 92 and a length smaller than a distance between the bicycle frame slotted opening 92 and the brake lever arm 12, thereby ensuring that while the screw 30 and the shoulder washer 24 are secured to the bicycle frame 82, the brake lever arm 12 is allowed to freely pivot with respect to the bicycle frame 82 within the above-described limits. The shoulder washer 24 further defines a distal end 28 configured to be slidably received within the brake lever arm distal end slotted opening 20 in order to accommodate the pivot of the brake lever arm 12.

The brake lever arm 12 is configured to minimize its rotation while providing adequate linear displacement of the yoke 50, and consequently providing adequate pull on the brake cable 48 to actuate the supplemental brake. In best illustrated in FIG. 4, where the distance $L_1$ between the axis of the threaded axle 64 and the centerline of the brake lever arm distal end slotted opening 20 is 5.0 inches, and the length $L_2$ of the brake lever arm distal end slotted opening 20 is 1.07 inches, and the diameter of the distal end 28 the shoulder washer 24 is 0.40 inches, then the rotation of the brake lever arm 12 is approximately 7.16 degrees with respect to the bicycle frame 82. In this example, where the distance $L_3$ between the axis of the threaded axle 64 and the slot 56 defined by the yoke 50 is 6.0 inches, the linear displacement of the yoke 50 is approximately 0.75 inches. However, it will be understood that the present invention is not limited to these dimensions, but that they may be varied to accommodate various bicycle configurations and various desired supplement brake efficiencies.

To install the brake 10 of the present invention, the brake lever arm 12 is rotated relative to the wheel hub until the bearings in the coaster brake 58 are restricted. The brake lever arm 12 is then rotated in an opposite direction approximately 35 degrees. After the brake lever arm 12 is assembled on the coaster brake 58, the flat washer 44 is mounted on the threaded axle 64 against the brake lever arm 12 to provide a bearing surface for the limiter cam 36. The limiter cam 36 is then mounted, with the tab 40 thereof received with the slotted keyway 66 defined by the threaded axle 64. The indexing pin 34 affixed the brake lever arm 12 engages the limiter cam 36 and limits the rotation of the brake lever arm 12. The nut 46 is screwed onto threaded axle 64 until it is snug, while allowing the brake lever arm 12 to rotate.

The rear wheel is assembled to the rear fork 88, with the washer 94 being placed on the threaded axle 64 and the nut 96 screwed on the threaded axle 64 but not tightened. The shoulder washer distal end 28 is inserted into the slotted opening 20 defined in the distal end 18 of the brake lever arm 12. The rear wheel is then rotated until the slotted opening 92 in the fork bracket 90 is aligned with the through opening in the shoulder washer 24, thereby allowing the socket head screw 30 to be inserted through the fork bracket 90 and the shoulder washer 24. The lock nut 32 is then screwed onto the socket head screw 30, but left loose. The chain (not shown) is then placed about the sprocket and the rear wheel is rotated clockwise until it stops. The shoulder washer 24 is positioned at the bottom of the slotted opening 20 in the brake lever arm distal end 18 and the indexing pin 34 is engaged with the lower of a pair of limiter cam teeth 42 between which it is disposed. The rear wheel is then pulled back for proper chain tension and locked into position by tightening the nut 96. The socket head screw 30 is then tightened. Finally, a standard brake actuating cable 48 is slid into position through the slot 56 in the yoke 50 and then attached to the supplemental brake.

While the illustrated embodiment is illustrated and described as actuating a supplemental brake via a cable, it will be understood that the present invention is not limited in scope to such linkage, but includes any linkage implemented to activate other brake types such as disc brakes.

Figure 5:
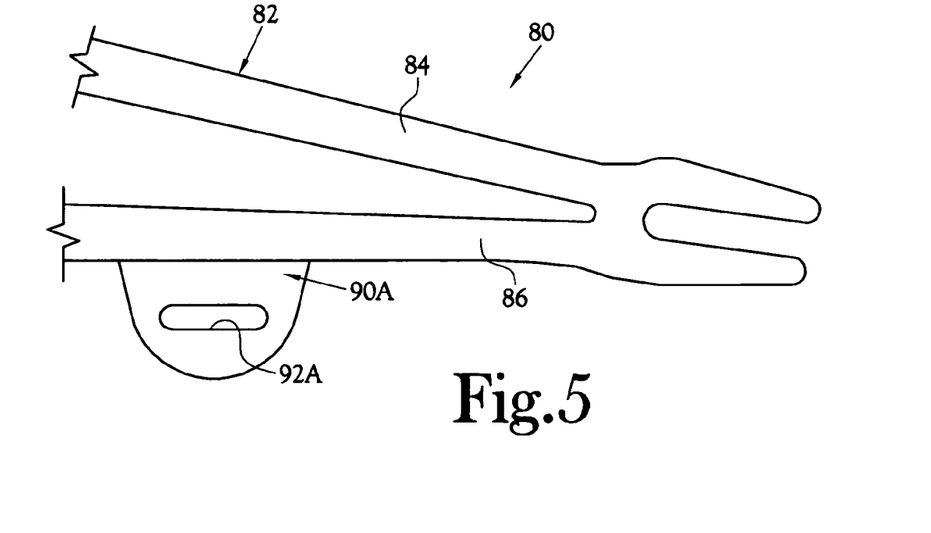
FIG. 5 is an elevation view of an alternate embodiment of the braking mechanism of FIG. 1, and specifically an alternate mechanism for pivotally mounting the distal end of the brake lever arm.

Illustrated in FIGS. 5-8 are alternate embodiments of the adaptations of the bicycle frame 82 to accommodate the mounting of the brake 10 of the present invention thereon. In FIG. 5, a bracket 90A is permanently secured under the lower frame member 86, and defines a slotted opening 92A. The slotted opening 92A is oriented substantially radially away from the axis of the rear wheel.

Figures 6, 7:
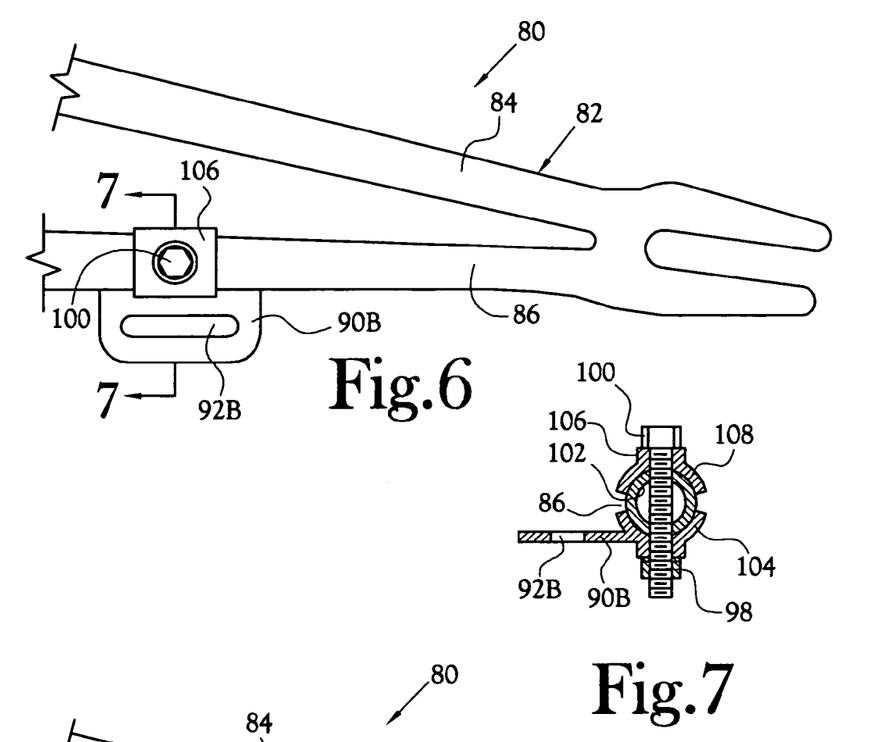
FIG. 6 is an elevation view of a further alternate embodiment of the braking mechanism of FIG. 1, and specifically a further alternate mechanism for pivotally mounting the distal end of the brake lever arm.
FIG. 7 is an end elevation view of the mounting mechanism, in section taken along 7-7 of FIG. 6.

Illustrated in FIGS. 6 and 7, a bracket 90B is removably secured to the lower frame member 86. The bracket 90B defines a slotted opening 92B similar to those described in previous embodiments. As better illustrated in the cross-sectional view of FIG. 7, the bracket 90B is bolted on using a conventional nut 98 and bolt 100. In order to accommodate the bolt 100, a through opening 102 is formed in the lower frame member 86. The bracket 90B of the illustrated embodiment includes a portion 104 configured to substantially conform to the contour of the lower frame member 86 in order to seat the bracket 90B thereon. A washer 106 is provided which also, in the illustrated embodiment, defines a portion 108 configured to substantially conform to the contour of the lower frame member 86.

Figure 8:
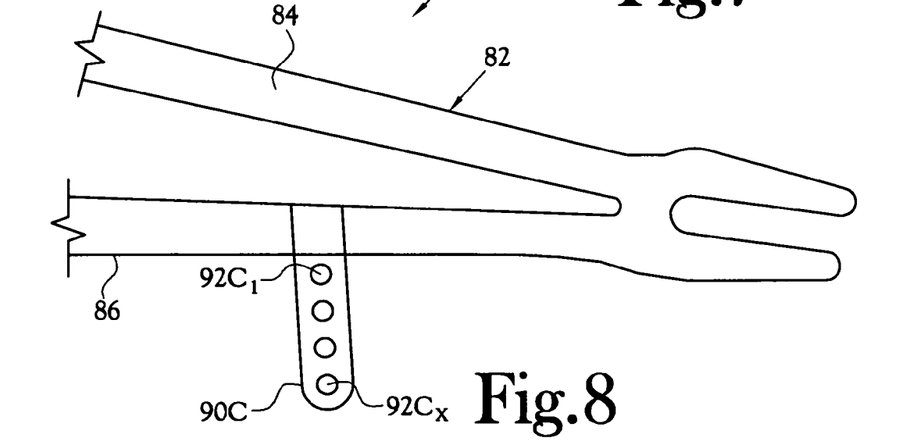
FIG. 8 is an elevation view of a still further alternate embodiment of the braking mechanism of FIG. 1, and specifically an alternate mechanism for pivotally mounting the distal end of the brake lever arm.

In the embodiment illustrated in FIG. 8, a bracket 90C defining a plurality of spaced openings 92C is defined. The plurality of spaced openings 92C is disposed such that the distance from each opening 92C to the axis of the threaded axle 64 increases from a first opening $92C_1$ to a last opening $92C_x$. In the illustrated embodiment, the first opening $92C_1$ is selected to maximize the chain tension, whereas the last opening $92C_x$ is selected to minimize such tension.

In operation, when the bicycle 80 is pedaled forward, the brake lever arm 12 is unrestricted by the coaster brake 58 and held upward by the actuated brake return springs (not shown). When back-pedaled, the coaster brake 58 starts to activate, thereby providing a reactive torque on the brake lever arm 12, forcing it counter-clockwise or downward, where the yoke 50 applies tension to the actuating cable 48. Full activation of the actuated brakes occurs before the shoulder washer 24 stops at the top portion of the slotted opening 20 in the brake lever arm distal end 18. However, in the event the supplemental brake fails or is disconnected, the brake lever arm 12 reaches its rotational limit and stops, while the coaster brake 58 operates normally. Conversely, if the coaster brake 58 fails, the supplemental brake is provided as a safety measure to allow the rider of the bicycle 80 to safely come to a stop. When operating correctly, the coaster brake 58 and the actuated brake activate simultaneously.

The simplest application of this invention is that where the supplemental brake is a rear wheel brake type. However, the supplemental brake may likewise be disposed to engage the front wheel, with design considerations and precautions taken to assure the proper ratio of front to back brake effectiveness is maintained for safety. Further, it will be understood that hand activation of brakes can augment the brake of the present invention.

From the foregoing description, it will be recognized by those skilled in the art that a braking mechanism including a pedal-actuated brake for actuating a rear wheel brake and a supplemental brake associated with either of the front or rear wheel a of a bicycle has been provided. The braking mechanism of the present invention provides for the actuation of a coaster brake, while further providing a simultaneously actuated supplemental brake to enhance the performance of the coaster brake. Further, the braking mechanism of the present invention provides a safety mechanism whereby if either of the coaster brake or the supplemental brake fails, the other of the brakes will continue to function.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A braking mechanism for actuating a supplemental brake associated with a bicycle, said braking mechanism being used in association with a pedal-actuated brake for actuating a rear wheel brake, the rear wheel brake being a coaster brake and including at least a cone having a key and a threaded axle defining a keyway, the threaded axle being rotatable relative to the key, the bicycle including a frame having a rear fork for mounting a rear wheel, the frame including an upper frame member and a lower frame member, said apparatus comprising:

a brake lever arm defining a proximal end and a distal end, said proximal end being adapted to engage the brake cone key, said distal end being adapted to slidably mount on said bicycle frame to allow said brake lever arm to rotate through a selected degree about an axis of the threaded axle, said brake lever arm defining an indexing pin fixed to and extending orthogonally away from said brake lever arm;

a yoke for releasably securing an end of a conventional brake cable, the conventional brake cable being secured at an opposite end to the supplemental brake; and a limiter cam defining a central opening having a tab configured to be received within the threaded axle keyway, said limiter cam defining a plurality of radially spaced-apart teeth, said brake lever arm indexing pin being received between a pair of said plurality of radially spaced-apart teeth, whereby said brake lever arm is permitted to rotate in each direction with respect to said limiter cam through a selected angle.

2. The braking mechanism of claim 1 further comprising a mounting bracket carried by the bicycle frame, said bracket defining at least one opening for receiving a fastener for mounting said brake lever arm distal end.

3. The braking mechanism of claim 2 wherein said at least one opening includes a slotted opening having a longitudinal axis extending substantially radially away from the threaded axle axis, said slotted opening being provided to accommodate tightening of a chain associated with the bicycle.

4. The braking mechanism of claim 2 wherein said bracket is permanently secured to the bicycle frame between the upper frame member and the lower frame member.

5. The braking mechanism of claim 1 wherein said brake lever arm is configured to define a slotted opening proximate said distal end thereof, and oriented substantially tangential to an arcuate path whose center point is at the axis of the coaster brake threaded axle, said brake arm being limited to rotational movement about the axis of the threaded axle with respect to the bicycle.

6. The braking mechanism of claim 5 further comprising a shoulder washer configured to define a first portion dimensioned to be freely and slidably received within said brake lever arm distal end slotted opening, said shoulder washer defining a second portion having a diameter larger than said brake lever arm distal end slotted opening, said second portion defining a length no greater than distance between said bicycle frame slotted opening and said brake lever arm, thereby ensuring that said brake lever arm is allowed to freely rotate with respect to the bicycle frame.

7. A braking mechanism for actuating a supplemental brake associated with a bicycle, said braking mechanism being used in association with a pedal-actuated brake for actuating a rear wheel brake, the rear wheel brake being a coaster brake and including at least a cone having a key and a threaded axle defining a keyway, the threaded axle being rotatable relative to the key, the bicycle including a frame having a rear fork for mounting a rear wheel, the frame including an upper frame member and a lower frame member, said apparatus comprising:
 a brake lever arm defining a proximal end and a distal end, said proximal end being adapted to engage the brake cone key, said distal end being adapted to slidably mount on said bicycle frame to allow said brake lever arm to rotate through a selected degree about an axis of the threaded axle, said brake lever arm defining an indexing pin fixed to and extending orthogonally away from said brake lever arm, said brake lever arm further defining a slotted opening proximate said distal end thereof, and oriented substantially tangential to an arcuate path whose center point is at the axis of the coaster brake threaded axle, said brake arm being limited to rotational movement about the axis of the threaded axle with respect to the bicycle;
 a yoke for releasably securing an end of a conventional brake cable, the conventional brake cable being secured at an opposite end to the supplemental brake;
 a limiter cam defining a central opening having a tab configured to be received within the threaded axle keyway, said limiter cam defining a plurality of radially spaced-apart teeth, said brake lever arm indexing pin being received between a pair of said plurality of radially spaced-apart teeth; whereby said brake lever arm is permitted to rotate in each direction with respect to said limiter cam through a selected angle; and
 a mounting bracket carried by the bicycle frame, said bracket defining at least one opening for receiving a fastener for mounting said brake lever arm distal end.

8. The braking mechanism of claim 7 wherein said at least one opening includes a slotted opening having a longitudinal axis extending substantially radially away from the threaded axle axis, said slotted opening being provided to accommodate the tightening of a chain associated with the bicycle.

9. The braking mechanism of claim 7 wherein said bracket is permanently secured to the bicycle frame between the upper frame member and the lower frame member.

10. The braking mechanism of claim 7 further comprising a shoulder washer configured to define a first portion dimensioned to be freely and slidably received within said brake lever arm distal end slotted opening, said shoulder washer defining a second portion having a diameter larger than said brake lever arm distal end slotted opening, said second portion defining a length no greater than a distance between said bicycle frame slotted opening and said brake lever arm, thereby ensuring that said brake lever arm is allowed to freely rotate with respect to the bicycle frame.

11. A braking mechanism for actuating a supplemental brake associated with a bicycle, said braking mechanism being used in association with a pedal-actuated brake for actuating a rear wheel brake, the rear wheel brake being a coaster brake and including at least a cone having a key and a threaded axle defining a keyway, the threaded axle being rotatable relative to the key, the bicycle including a frame having a rear fork for mounting a rear wheel, the frame including an upper frame member and a lower frame member, said apparatus comprising:
 a brake lever arm defining a proximal end and a distal end, said proximal end being adapted to engage the brake cone key, said distal end being adapted to slidably mount on said bicycle frame to allow said brake lever arm to rotate through a selected degree about an axis of the threaded axle, said distal end being permitted to move through an angular distance sufficient to activate the supplemental brake and limited to move through an angular distance to activate the coaster brake in the event of a supplemental brake failure, said brake lever arm defining an indexing pin fixed to and extending orthogonally away from said brake lever arm;
 a yoke for releasably securing an end of a conventional brake cable, the conventional brake cable being secured at an opposite end to the supplemental brake; and
 a limiter cam defining a central opening having a tab configured to be received within the threaded axle keyway, said limiter cam defining a plurality of radially spaced-apart teeth, said brake lever arm indexing pin being received between a pair of said plurality of radially spaced-apart teeth, whereby said brake lever arm is permitted to rotate in each direction with respect to said limiter cam through a selected angle, said limiter cam teeth being radially spaced-apart to limit bi-directional rotation of the brake cone to assure proper bearing play is maintained while permitting sufficient bi-directional rotation of said brake lever arm.

12. The braking mechanism of claim 11 further comprising a mounting bracket carried by the bicycle frame, said bracket defining at least one opening for receiving a fastener for mounting said brake lever arm distal end.

13. The braking mechanism of claim 12 wherein said at least one opening includes a slotted opening having a longitudinal axis extending substantially radially away from the threaded axle axis, said slotted opening being provided to accommodate the tightening of a chain associated with the bicycle.

14. The braking mechanism of claim 12 wherein said bracket is permanently secured to the bicycle frame between the upper frame member and the lower frame member.

15. The braking mechanism of claim 11 wherein said brake lever arm is configured to define a slotted opening proximate said distal end thereof, and oriented substantially tangential to an arcuate path whose center point is at the axis of the coaster brake threaded axle, said brake arm being limited to rotational movement about the axis of the threaded axle with respect to the bicycle.

16. The braking mechanism of claim 15 further comprising a shoulder washer configured to define a first portion dimensioned to be freely and slidably received within said brake lever arm distal end slotted opening, said shoulder washer defining a second portion having a diameter larger than said brake lever arm distal end slotted opening, said second portion defining a length no greater than a distance between said bicycle frame slotted opening and said brake lever arm, thereby ensuring that said brake lever arm is allowed to freely rotate with respect to the bicycle frame.

* * * * *